United States Patent
Alameh et al.

(10) Patent No.: US 10,420,031 B2
(45) Date of Patent: Sep. 17, 2019

(54) METHOD AND APPARATUS FOR IN-POCKET DETECTION BY AN ELECTRONIC DEVICE

(71) Applicant: Motorola Mobility LLC, Chicago, IL (US)

(72) Inventors: Rachid M Alameh, Crystal Lake, IL (US); Paul Steuer, Hawthorn Woods, IL (US)

(73) Assignee: Motorola Mobility LLC, Chicago, IL (US)

( * ) Notice: Subject to any disclaimer, the term of this patent is extended or adjusted under 35 U.S.C. 154(b) by 408 days.

(21) Appl. No.: 14/737,969

(22) Filed: Jun. 12, 2015

(65) Prior Publication Data
US 2016/0366639 A1    Dec. 15, 2016

(51) Int. Cl.
*H04B 1/38*    (2015.01)
*H04W 52/02*    (2009.01)

(52) U.S. Cl.
CPC ..... *H04W 52/027* (2013.01); *H04W 52/0251* (2013.01); *H04W 52/0254* (2013.01); *Y02D 70/00* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/166* (2018.01)

(58) Field of Classification Search
CPC ................ H04W 52/027; H04W 52/0251
USPC ........................................................ 455/574
See application file for complete search history.

(56) References Cited

U.S. PATENT DOCUMENTS

| | | | | |
|---|---|---|---|---|
| 8,874,129 | B2* | 10/2014 | Forutanpour | ....... G06F 3/04883 455/456.1 |
| 8,963,845 | B2* | 2/2015 | Alameh | ............ H04M 1/72569 345/173 |
| 8,996,767 | B2* | 3/2015 | Eaton | ................ H04M 1/72569 710/72 |
| 9,075,435 | B1* | 7/2015 | Noble | ..................... G06F 3/013 |
| 9,237,601 | B2* | 1/2016 | Forutanpour | .......... H04W 88/02 |
| 9,268,136 | B1* | 2/2016 | Starner | ................ G02B 27/017 |
| 9,497,592 | B2* | 11/2016 | Venkatraman | ........ H04W 4/023 |
| 2007/0197263 | A1 | 8/2007 | Gudmand-Hoyer | |
| 2008/0036591 | A1 | 2/2008 | Ray | |
| 2010/0279661 | A1 | 11/2010 | Furuta et al. | |
| 2011/0077055 | A1 | 3/2011 | Pakula et al. | |

(Continued)

OTHER PUBLICATIONS

"Exam Report", Great Britain Application No. GB1613566.7; dated Mar. 29, 2017.

(Continued)

*Primary Examiner* — Amancio Gonzalez
(74) *Attorney, Agent, or Firm* — Philip H. Burrus, IV

(57) ABSTRACT

An electronic device includes one or more processors, a motion detector, a temperature sensor, and/or one or more proximity sensor components. The one or more processors can detect the electronic device is disposed within a pocket. This can be done as a function of at least motion of the electronic device, an absence of finger touch along a housing of the electronic device, and an approximately common temperature occurring at both a first end of the electronic device and a second end of the electronic device. When the electronic device is detected in-pocket, the one or more processors can perform a control operation.

13 Claims, 9 Drawing Sheets

(56) References Cited

U.S. PATENT DOCUMENTS

2012/0280917 A1*  11/2012  Toksvig .............. G06F 1/1626
                                                                    345/173
2012/0315880 A1   12/2012  Peitrow et al.
2013/0297926 A1   11/2013  Eaton et al.
2016/0162007 A1*  6/2016   Kim ................... G06F 1/3231
                                                                    713/323
2017/0052613 A1   2/2017   Alameh

OTHER PUBLICATIONS

Chow, Wing , "NonFinal OA", U.S. Appl. No. 14/829,107, filed Aug. 18, 2015; dated Feb. 16, 2017.
Chow, Wing , "NonFinal OA", U.S. Appl. No. 14/829,107, filed Aug. 18, 2015; dated Jan. 28, 2019.
Chow, Wing H. , "Appeal Decision", U.S. Appl. No. 14/829,107, filed Aug. 18, 2015; Mailed Jul. 31, 2018.
Chow, Wing H. , "Final OA", U.S. Appl. No. 14/829,107, filed Aug. 18, 2015; dated Jun. 21, 2017.
Maurice, Russell , "Exam Report", GB Application No. GB1613566.7; dated Jan. 17, 2018.
Chow, Wing , "Final Office Action", U.S. Appl. No. 14/829,107; Filed Aug. 18, 2015; dated Jun. 18, 2019.

\* cited by examiner

METHOD AND APPARATUS FOR IN-POCKET DETECTION BY AN ELECTRONIC DEVICE

BACKGROUND

Technical Field

This disclosure relates generally to electronic devices and corresponding methods, and more particularly to electronic devices with proximity and other sensors.

Background Art

Mobile electronic communication devices, such as mobile telephones, smart phones, gaming devices, and the like, are used by billions of people. These owners use mobile communication devices for many different purposes including, but not limited to, voice communications and data communications for text messaging, Internet browsing, commerce such as banking, and social networking.

As the technology of these devices has advanced, so too has their feature set. For example, not too long ago all electronic devices had physical keypads. Today touch sensitive displays are more frequently seen as user interface devices. Similarly, it used to be that the only way to deliver user input to a device was with touch, either through a keypad or touch sensitive display. Today some devices are equipped with voice recognition that allows a user to speak commands to a device instead of typing them.

These smaller, yet more powerful, devices are being used for many different applications in many different environments. It would be advantageous to be able to detect certain environments and adapt performance of an electronic device to better perform in a given environment.

Figure 1:
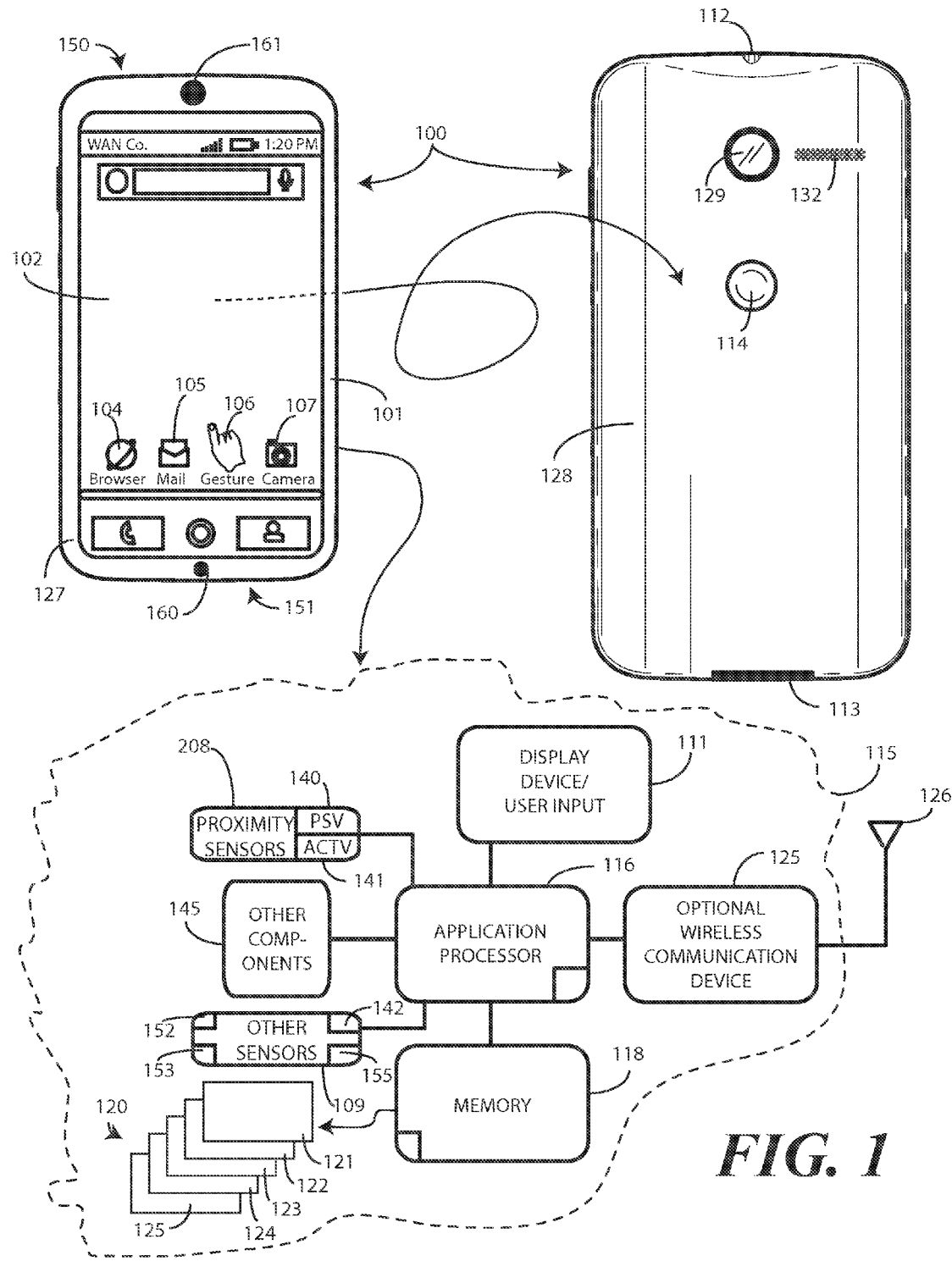
FIG. 1 illustrates a schematic block diagram of one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting that an electronic device is disposed within a pocket. Process descriptions or blocks in a flow chart can be modules, segments, or portions of code that implement specific logical functions of a machine or steps in a process, or alternatively that transition specific hardware components into different states or modes of operation. Alternate implementations are included, and it will be clear that functions may be executed out of order from that shown or discussed, including substantially concurrently or in reverse order, depending on the functionality involved.

It will be appreciated that embodiments of the disclosure described herein may be comprised of one or more conventional processors and unique stored program instructions that control the one or more processors to implement, in conjunction with certain non-processor circuits, some, most, or all of the functions of detecting that an electronic device is disposed within a pocket, and optionally executing one or more control operations in response, as described herein. The non-processor circuits may include, but are not limited to, microphones, loudspeakers, acoustic amplifiers, digital to analog converters, signal drivers, clock circuits, power source circuits, and user input devices. As such, these functions may be interpreted as steps of a method to perform the detection that the device is disposed within a pocket. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by reducing power consumption, extending run time, and improving the overall user experience to overcome problems specifically arising in the realm of the technology associated with electronic device user interaction.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an accurate and repeatable method and apparatus for detecting that an electronic device is disposed within a pocket. For example, in one embodiment a method for controlling an electronic device equipped with one or more sensors comprises detecting, with the one or more of the sensors, the electronic device is disposed within the pocket as a function of detecting a particular motion of the electronic device, an absence of any finger touch along a housing of the electronic device, and detecting approximately a common temperature at both a first location of the electronic device and a second location of the electronic device. The first location and the second location can be on the same side of the electronic device, or alternatively can be on different sides or ends of the electronic device. In one embodiment, when these or other conditions are met, one or more processors operable with the one or more sensors detect that the electronic device is in a user's pocket rather than another location, such as in their hand, on a table, or disposed within a drawer. In one embodiment, the one or more processors can optionally perform a control operation in response to detecting the electronic device is disposed within the pocket.

Embodiments of the disclosure can quickly and accurately determine encapsulation by a pocket so that the device can perform one or more control operations in response. Embodiments of the disclosure are further capable of distinguishing this in-pocket state from other conditions, such as when a user lifts an electronic device to their face, an activity that can have very similar motion signatures to the act of placing an electronic device in a pocket. Advantageously, embodiments of the disclosure provide a natural, immediate, and intuitive manner of controlling an electronic device without the need to deliver voice commands or touch input to a user interface. With embodiments of the disclosure, a user can trigger, activate, actuate, or initiate control functions of an electronic device simply by placing the electronic device securely within their very own pocket.

Illustrating by example, in one embodiment an electronic device includes at least a motion sensor, a touch sensor, and one or more proximity sensors. The one or more proximity sensors can each include an infrared receiver to receive infrared thermal emissions from an object disposed external to the housing. Accordingly, the one or more proximity sensors function as thermal sensors to detect heat from a user's body.

In one embodiment, one or more processors operable with the sensors can detect background conditions using the sensors to conclude that the electronic device is disposed within a pocket. For example, the one or more processors can detect motion of the device with the motion sensor to determine that the electronic device is proximately located with a user's body. Similarly, the one or more processors can determine that a user is not actively touching a housing or user interface of the electronic device. This is referred to as detecting the "absence of any finger touch" with the touch sensor.

As will be described in more detail below, the "absence of finger touch" is a novel and innovative concept used to determine an in-pocket condition. Embodiments of the disclosure contemplate that modern electronic devices can include many different types of sensors. For example, embodiments of the present disclosure include touch sensors, which may be capacitive touch sensors, and that may be placed at various locations along the housing of an electronic device. While capacitive touch sensors can be used in one embodiment, mechanical touch sensors, resistive touch sensors, and other types of touch sensors can be used as well. Those of ordinary skill in the art understand that touch sensors are used to detect the positive state, i.e., touch, to detect user presence, user input, and other conditions. However, embodiments of the disclosure employ the innovative use of the negative condition, i.e., an active touch sensor that is awaiting touch input, but that does not receive the same within a predetermined sensor read time. Advantageously, embodiments of the disclosure uniquely employ this corollary state as a factor in concluding that an electronic device is disposed within a pocket. As used herein, detecting the "absence of finger touch" is used to refer to a touch sensor that is in an active state that can receive touch input, but that fails to receive any touch input, within a predetermined sensor read time. Examples of these predetermined sensor read times range from a few milliseconds to several seconds.

In one embodiment, the one or more processors can further determine that a temperature at both a first location on the electronic device and a second location on the electronic device is an approximately common temperature. As used herein, an "approximately common" temperature refers to a temperature that is within a predetermined range. Said differently, a temperature at a first location of the electronic device would be approximately common with a temperature at a second location of the electronic device, in one embodiment, when a difference between the temperatures at each end was within plus or minus two degrees centigrade, for example. Moreover, the term "approximately" is used to refer to an amount that does not have to be absolute, but can include some designed tolerance. For example, 79.378 degrees Fahrenheit or 80.125 degrees Fahrenheit could be "approximately" 80 degrees Fahrenheit when including the tolerances of mechanical and electrical systems and sensors. This distinguishes in-pocket conditions from conditions in which a user is holding the device, wherein portions of the housing adjacent to a user's hand would be significantly warmer than other portions of the housing. While plus or minus two degrees is one explanatory range constituting "approximately common" temperatures, others will be readily apparent to those of ordinary skill in the art having the benefit of this disclosure.

In one embodiment, when the one or more processors determine that the motion of the electronic device is defined by parametric data that corresponds to movement of a user's body, such as the user, walking, breathing, driving, riding a bike, or simply shifting in their seat, and there is no touch input being delivered to the touch sensor, and there is approximately the same temperature at two different locations of the device, the one or more processors can conclude that the electronic device is disposed within a pocket. Accordingly, in one or more embodiments the one or more processors can execute a control operation in response to the electronic device being disposed within the pocket.

In addition to the three factors set forth above, other inputs from other sensors can be used to confirm with greater certainty that the electronic device is, for example, situated within a pocket rather than simply placed within a drawer. For example, in one embodiment the one or more proximity sensors can confirm that the approximately common temperature is above a predetermined threshold. If the electronic device is disposed in a drawer, the ambient temperature in the drawer will likely be near room temperature. However, when disposed within a pocket, the user's body heat will elevate the ambient temperature to something closer to a person's body temperature. Accordingly, the one or more processors may check to see whether the approximately common temperature is above a threshold between room temperature and 98.6 degrees Fahrenheit. One example of such a threshold might be eighty degrees Fahrenheit. Others will be obvious to those of ordinary skill in the art having the benefit of this disclosure.

Similarly, in another embodiment the one or more processors may detect, with a motion sensor, a gravity direction that indicates a tilt or orientation, referred to as static acceleration, of the electronic device. Since electronic devices such as mobile phones are frequently carried in a front pocket in either a top-down or bottom-down orientation (i.e., seldom side-down), in one embodiment the one or more processors may use the motion sensor to confirm that a component of the gravity direction runs from a predefined first end of the electronic device to a predetermined second end of the electronic device. Other techniques for confirming that the electronic device is disposed within a pocket and not in another location will be explained in detail below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a conventional desktop computer, palm-top computer, a tablet computer, a gaming device, a media player, or other device.

This illustrative electronic device 100 includes a display 102, which may optionally be touch-sensitive. In one embodiment where the display 102 is touch-sensitive, the display 102 can serve as a primary user interface of the electronic device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 101. In one embodiment, the housing 101 includes two housing members. A front housing member 127 is disposed about the periphery of the display 102 in one embodiment. A rear-housing member 128 forms the backside of the electronic device 100 in this illustrative embodiment and defines a rear major face of the electronic device. Features can be incorporated into the housing members 127,128. Examples of such features include an optional camera 129 or an optional speaker port 132, which are show disposed on the rear major face of the electronic device 100 in this embodiment. In this illustrative embodiment, a user interface component 114, which may be a button or touch sensitive surface, can also be disposed along the rear-housing member 128. These features are shown being disposed on the rear major face of the electronic device 100 in this embodiment, but could be located elsewhere, such as on the front major face in other embodiments.

In one embodiment, the electronic device 100 includes one or more connectors 112,113, which can include an analog connector, a digital connector, or combinations thereof. In this illustrative embodiment, connector 212 is an analog connector disposed on a first end 250, i.e., the top end, of the electronic device 200, while connector 213 is a digital connector disposed on a second end 251 opposite the first end 250, which is the bottom end in this embodiment.

A block diagram schematic 115 of the electronic device 100 is also shown in FIG. 1. In one embodiment, the electronic device 100 includes one or more processors 116. In one embodiment, the one or more processors 116 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n), and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the electronic device 100. For example, in one embodiment the one or more processors 116 comprise one or more circuits operable with one or more user interface devices 111, which can include the display 102, to present presentation information to a user. The executable software code used by the one or more processors 116 can be configured as one or more modules 120 that are operable with the one or more processors 116. Such modules 120 can store instructions, control algorithms, logic steps, and so forth.

In one embodiment, the one or more processors 116 are responsible for running the operating system environment 121. The operating system environment 121 can include a kernel 122 and one or more drivers, and an application service layer 123, and an application layer 124. The operating system environment 121 can be configured as executable code operating on one or more processors or control circuits of the electronic device 100.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 100, an electronic mail application 105 configured to send and receive electronic mail, a gesture application 106 configured to detect gesture actions by a user near or along the electronic device 100, and a camera application 107 configured to capture still (and optionally video) images. These applications are illustrative only, as others will be obvious to one of ordinary skill in the art having the benefit of this disclosure. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

In one embodiment, one or more proximity sensors 108 can be operable with the one or more processors 116. In one embodiment, the one or more proximity sensors 108 include one or more proximity sensor components 140. The proximity sensors 108 can also include one or more proximity detector components 141. In one embodiment, the proximity sensor components 140 comprise only signal receivers. By contrast, the proximity detector components 141 include a signal receiver and a corresponding signal transmitter.

While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments the proximity sensor components have a longer detection range than do the proximity detector components due to the fact that the proximity sensor components detect heat directly emanating from a person's body (as opposed to reflecting off the person's body) while the proximity detector components rely upon reflections of infrared light emitted from the signal transmitter. For example, the proximity sensor component may be able to detect a person's body heat from a distance of about ten feet, while the signal receiver of the proximity detector component may only be able to detect reflected signals from the transmitter at a distance of about one to two feet.

In one embodiment, the proximity sensor component 140 comprises an infrared signal receiver so as to be able to detect infrared emissions from a person. Accordingly, the proximity sensor component 140 requires no transmitter since objects disposed external to the housing deliver emissions that are received by the infrared receiver. As no transmitter is required, each proximity sensor component 140 can operate at a very low power level. Evaluations conducted show that a group of infrared signal receivers can operate with a total current drain of just a few microamps (~10 microamps per sensor). By contrast, a proximity detector component 141, which includes a signal transmitter, may draw hundreds of microamps to a few milliamps.

In one embodiment, one or more proximity detector components 141 can each include a signal receiver and a corresponding signal transmitter. The signal transmitter can transmit a beam of infrared light that reflects from a nearby object and is received by a corresponding signal receiver. The proximity detector components 141 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals. The reflected signals can also be used to receive user input from a user delivering touch or gesture input to the electronic device 100.

In one embodiment, the one or more processors 116 may generate commands or execute control operations based on information received from one or more proximity sensors 108. The one or more processors 116 may also generate commands or execute control operations based upon information received from a combination of the one or more proximity sensors 108 and one or more other sensors 109. Alternatively, the one or more processors 116 can generate commands or execute control operations based upon information received from the one or more other sensors 109 alone. Moreover, the one or more processors 116 may process the received information alone or in combination with other data, such as the information stored in the memory 118.

The one or more other sensors 109 may include a microphone 160, an earpiece speaker 161, a second loudspeaker (disposed beneath speaker port 132), and a user interface component 114 such as a button. The one or more other sensors 109 may also include key selection sensors, a touch pad sensor, a touch screen sensor, a capacitive touch sensor, and one or more switches. Touch sensors 155 may used to indicate whether any of the user actuation targets present on the display 102 are being actuated. Alternatively, touch sensors 155 disposed in the housing 101 can be used to determine whether the electronic device 100 is being touched at side edges or major faces of the electronic device 100 are being performed by a user. The touch sensors 155 can include surface and/or housing capacitive sensors in one embodiment. The other sensors 109 can also include audio sensors and video sensors (such as a camera).

The other sensors 109 can also include motion detectors 142, such as one or more accelerometers 152 or gyroscopes 153. For example, an accelerometer 152 may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope 153 can be used in a similar fashion.

Regardless of the type of motion detectors 142 that are used, in one embodiment the motion detectors 142 are also operable to detect movement, and direction of movement, of the electronic device 100 by a user. In one or more embodiments, the other sensors 109 and the motion detectors 142 can each be used to detect motion corresponding to a user's body or to human motion. This information can be used to determine that the electronic device 100 is proximately located with a user's body.

Illustrating by example, in one embodiment when the electronic device 100 is placed within a pocket of clothing that a user is wearing, the motion detectors 142 can be used to detect predefined motions corresponding to human motion. These predefined motions can be small, and can include vibration, shaking, breathing, micromotions, and so forth. For instance, if the user is walking, the motion detectors 142 can detect this movement. The one or more processors 116 can then extract parametric data from electronic signals delivered by these motion detectors 142 in response to the user walking. By comparing the parametric data to a reference file stored in memory 118, the one or more processors 116 can identify the walking motion as corresponding to the motion of the user's body. The one or more processors 116 can use this information to distinguish the electronic device 100 being in a user's pocket compared to, for example, being in a drawer.

Similarly, if the user is simply sitting in a chair, the motion detectors 142 can be used to detect body motions—even tiny ones—such as that of the user breathing. By comparing the parametric data extracted from this motion to a reference file stored in memory 118, the one or more processors 116 can identify the fact that the movement that the electronic device 100 is experiencing is due to the fact that the electronic device 100 is proximately located with a user's torso, limbs, head, or appendages, or otherwise generally disposed along the user body instead of, for example, being placed on a table. Other user motion that can be readily detected by parametric data includes motion associated with driving, riding a bike, or simply shifting in their seat. In one or more embodiments, the one or more processors 116 can conclude from these motions that the electronic device 100 is disposed near or on a person's body. The motion detectors 142 can be used to detect other movement of the electronic device 100 as well. For example, in some embodiments a user can deliver gesture input by moving a hand or arm in predefined motions in close proximity to the electronic device 100.

Many of the sensors in the electronic device 100 can be used to detect movement, gestures, or other user input. For example, the one or more proximity sensors 108 can detect the gesture of a user waving a hand above the display 102. In another embodiment, the user can deliver gesture input by touching the display 102. In yet another embodiment, the accelerometer 152 can detect gesture input from a user lifting, shaking, or otherwise deliberately moving the electronic device 100. In yet other embodiments, the user can deliver gesture input by rotating or changing the orientation of the electronic device 100, which can be detected by multiple accelerometers 152 or a gyroscope 153.

Figure 2:
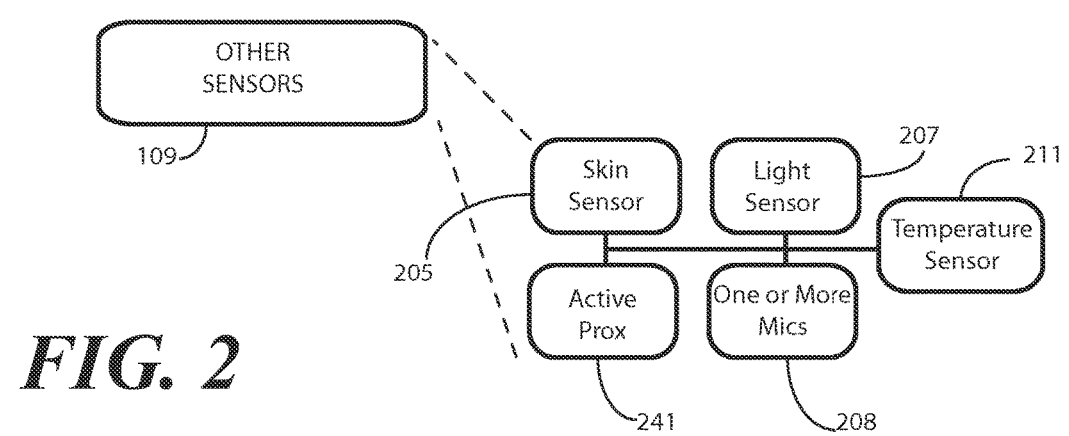
FIG. 2 illustrates examples of sensors that can be included in an electronic device configured in accordance with one or more embodiments of the disclosure.

It should be clear to those of ordinary skill in the art having the benefit of this disclosure that additional sensors can be included with the other sensors 109 shown in FIG. 1. Turning briefly to FIG. 2, illustrated therein are some additional sensors that can be operable with the one or more processors (116) as well. General examples of these sensors include time sensors, date sensors, environmental sensors, weather sensors, ultrasonic sensors, location sensors, and so forth.

In one embodiment, a skin sensor 205 is configured to determine when the electronic device (100) is proximately located with the skin of a wearer. For example, when the electronic device (100) is being held within the hand of a user, this can be detected by the skin sensor. A light sensor 207 can be used to detect whether or not direct light is incident on the housing (101) of the electronic device (100). A proximity detector component 141 can emit infrared signals to determine when the electronic device (100) is covered by an object such as clothing. One or more microphones 208 can be configured to detect an audio signature corresponding to a clothing object covering the housing (101) of the electronic device (100). Other sensors, subsets of these sensors, and so forth can be used in accordance with the methods described herein. As noted above, in one embodiment the touch sensor (155) can be placed along the edge of the housing 101 of the electronic device 100 to detect when the electronic device 100 is grabbed by a hand and/or fingers.

These other sensors 109 can be used to confirm the electronic device (100) is disposed within a pocket in one or more embodiments. Said differently, when the one or more processors (116) determine that the motion of the electronic device (100) is defined by parametric data that corresponds to movement of a user's body, and there is no touch input being delivered to the touch sensor (155), and there is approximately the same temperature at two different locations on the electronic device (100), and the one or more processors (116) conclude that the electronic device (100) is disposed within a pocket, one or more of these other sensors 109 can be used to confirm this conclusion in one or more embodiments. For example, the light sensor 207 may detect that direct light is not incident along the housing (101), thereby confirming that the electronic device (100) is covered. The microphone 208 may detect the sound of clothing as the electronic device (100) slides into the pocket. The skin sensor 205 may detect that no skin is touching the housing (101). The proximity detector component 241 may determine that the electronic device (100) is covered. The temperature sensor 211 can be used to determine temperatures of the ends of the electronic device (100) instead of proximity sensor components (140). These each can provide a confirmation of the in-pocket condition, and can be used alone or in combination with other factors.

Turning now back to FIG. 1, other components 145 operable with the one or more processors 116 can include output components such as video outputs, audio outputs, and/or mechanical outputs. Examples of output components include audio outputs such as speaker port 132, earpiece speaker 161, or other alarms and/or buzzers and/or a mechanical output component such as vibrating or motion-based mechanisms. Still other components will be obvious to those of ordinary skill in the art having the benefit of this disclosure.

In one or more embodiments, the one or more processors 116 are operable to detect motion of the electronic device 100. In one embodiment, the accelerometer 152 serves as a motion detector operable with the one or more processors 116. A gyroscope 153 then serves as another motion detector operable with the one or more processors 116. Where a gyroscope 153 is not included with the electronic device 100, multiple accelerometers can substitute for the gyroscope 153 to determine rotation of the electronic device 100 about the axis. In such an embodiment, the accelerometer 152 would serve as the motion detector while the accelerometer 152 and another accelerometer substitute for the gyroscope 153. This results in the other motion detector having an accelerometer 152 in common with the motion detector.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 3:
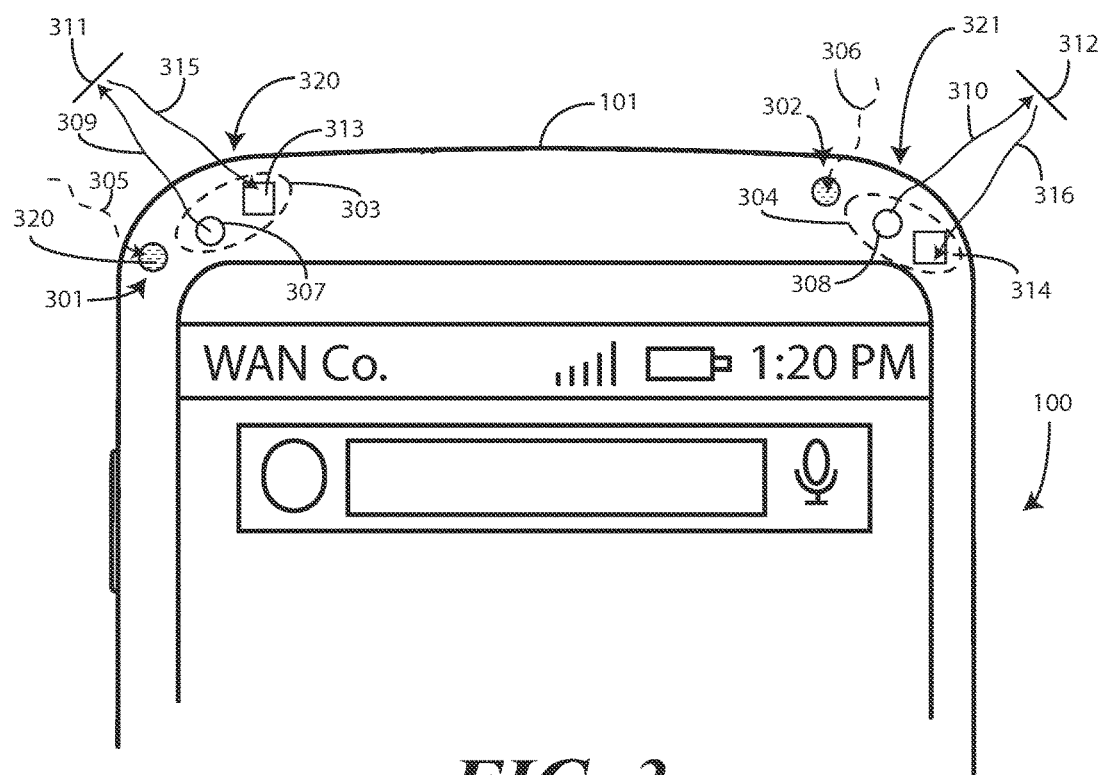
FIG. 3 illustrates explanatory proximity sensor component and proximity detector component configurations in accordance with one or more embodiments of the disclosure.

Turning now to FIG. 3, illustrated therein is the difference between proximity sensor components 301,302 and proximity detector components 303,304 as those terms are used herein. Illustrated therein are two proximity sensor components 301,302 and two proximity detector components 303, 304, each disposed at different locations 320,321, each of which happens to be a corner of the electronic device 100 in this illustrative embodiment. In this embodiment, each proximity sensor component 301,302 comprises a signal receiver 313 only, such as an infrared photodiode to detect an infrared emission 305,306 from an object external to the housing 101 of the electronic device 100. No corresponding transmitter is included or required for the proximity sensor component 301,302 to function. As no active transmitter emitting signals is included, each proximity sensor component 301,302 is sometimes referred to as a "passive IR" proximity sensor. As the proximity sensor components 301, 302 receive thermal emissions from an object, in one or more embodiments they can be used as temperature sensors.

By contrast, each proximity detector component 303,304 can be an infrared proximity sensor set that uses a signal emitter 307,308 that transmits a beam 309,310 of infrared light that reflects 311,312 from a nearby object and is received by a corresponding signal receiver 313,314. Proximity detector components 303,304 can be used, for example, to compute the distance to any nearby object from characteristics associated with the reflected signals 315,316. The reflected signals 315,316 are detected by the corresponding signal receiver 313,314, which may be an infrared photodiode used to detect reflected light emitting diode (LED) light, respond to modulated infrared signals, and/or perform triangulation of received infrared signals. Accordingly, the proximity detector components 303,304 can be used to determine if the electronic device 100 is covered by clothing in one or more embodiments.

In one embodiment, the proximity sensor components 301,302 and the proximity detector components 303,304 can include at least two sets of components. For example, a first set of components can be disposed at a location 320 on the electronic device 100, while another set of components can be disposed at a second location 321 on the electronic device 100.

Figure 4:
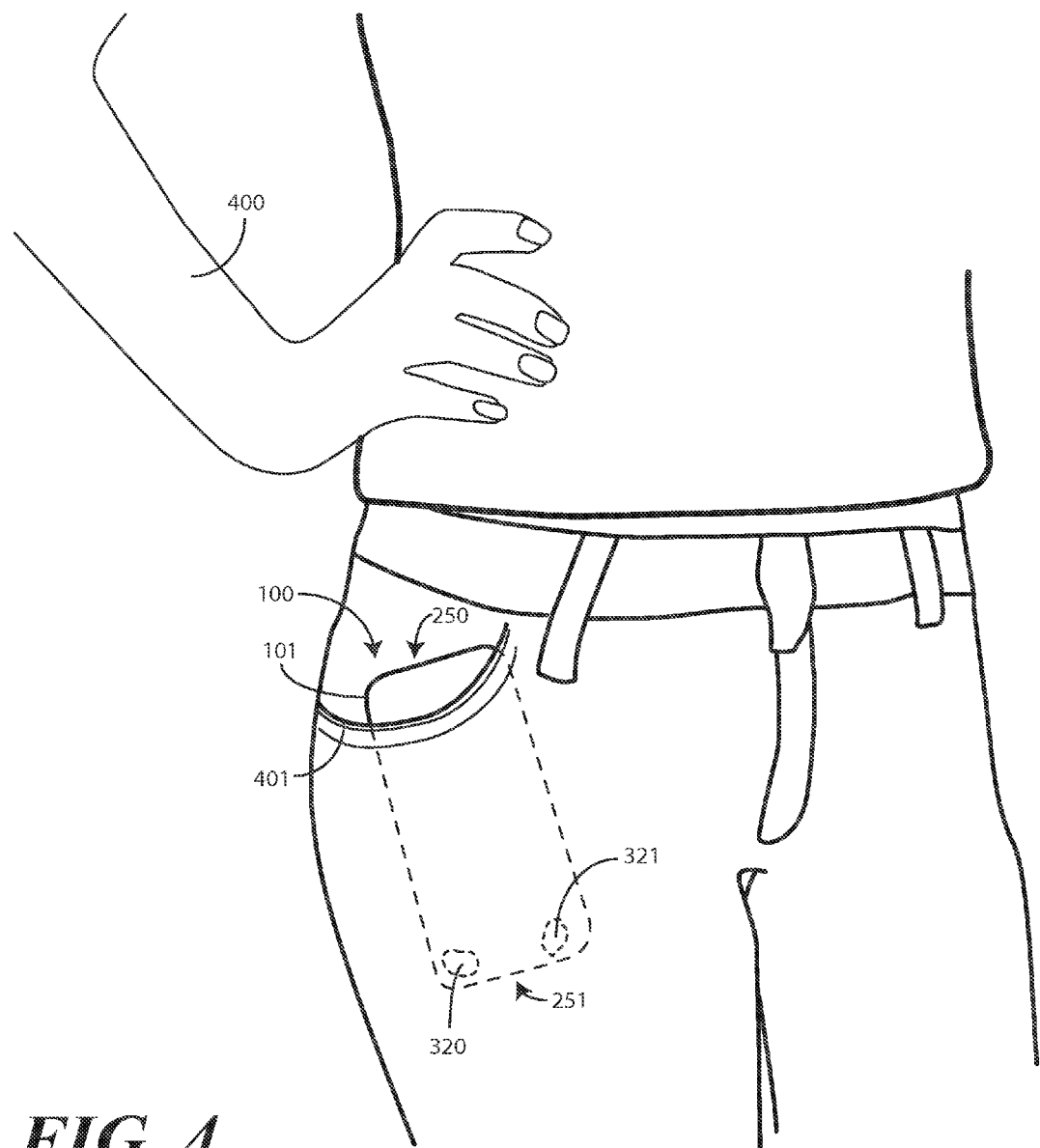
FIG. 4 illustrates an explanatory electronic device in accordance with one or more embodiments of the disclosure disposed within the pocket of a user.

Now that the various hardware components have been described, attention will be turned to methods and use cases in accordance with one or more embodiments of the disclosure. Turning now to FIG. 4, an electronic device 100 is disposed within the pocket 401 of a user 400. Advantageously, embodiments of the disclosure can detect this condition simply, quickly, and accurately. In one embodiment, using a motion detector (142), a touch sensor (155), and a temperature sensor (211), or alternatively one or more proximity sensor components (140), one or more processors (116) of the electronic device 100 detect one or more conditions to determine that the electronic device 100 is disposed within the pocket 401.

For example, the one or more processors (116) can determine motion of the electronic device 100 from the motion detector (142) and can extract parametric data to confirm that this motion corresponds to human movement or motion of a human's body. The temperature sensor (211), or alternatively the one or more proximity sensor components (140), can determine whether a temperature disposed at a first location 320 and a second location 321 is an approximately common temperature. It should be noted that the first location 320 and the second location 321 can be located on the same side or end 351 of the electronic device 100 in one embodiment. For example, in the illustrative embodiment of FIG. 4, the first end 250 of the electronic device 100 is exposed to the environment while the second end 251 is disposed within the pocket 401. Accordingly, the first end 250 and the second end 251 can be expected to experience different temperatures. Thus, in this configuration it is advantageous that the first location 320 and the second location 321 are disposed at the same end, i.e., the second end 251. In other embodiments, however, such as when the electronic device 100 is completely disposed within the pocket 401, it can be advantageous to have the first location 320 and the second location 321 disposed at opposite ends, i.e., one at the first end 250 and one at the second end 251, of the electronic device 100. By placing proximity sensor components (140) about the perimeter of the electronic device 100, the one or more processors (116) can select where the first location 320 and the second location 321 are on a case-by-case basis.

The touch sensor (155) can detect an absence of finger touch along a housing 101 of the electronic device. The one or more processors (116) can then confirm that the electronic device 100 is disposed within the pocket 401, in one embodiment, when the movement includes parametric data corresponding to human movement, the absence of finger touch is confirmed, and the temperature at both the first end and the second end is an approximately common temperature. In one or more embodiments, the one or more processors (116) can then perform a control operation in response thereto. For example, the one or more processors (116) can transition the electronic device 100 from an active mode of operation to a low power or sleep mode. Additional confirmation processes can be used as well. Each will be described in subsequent figures.

Figure 5:
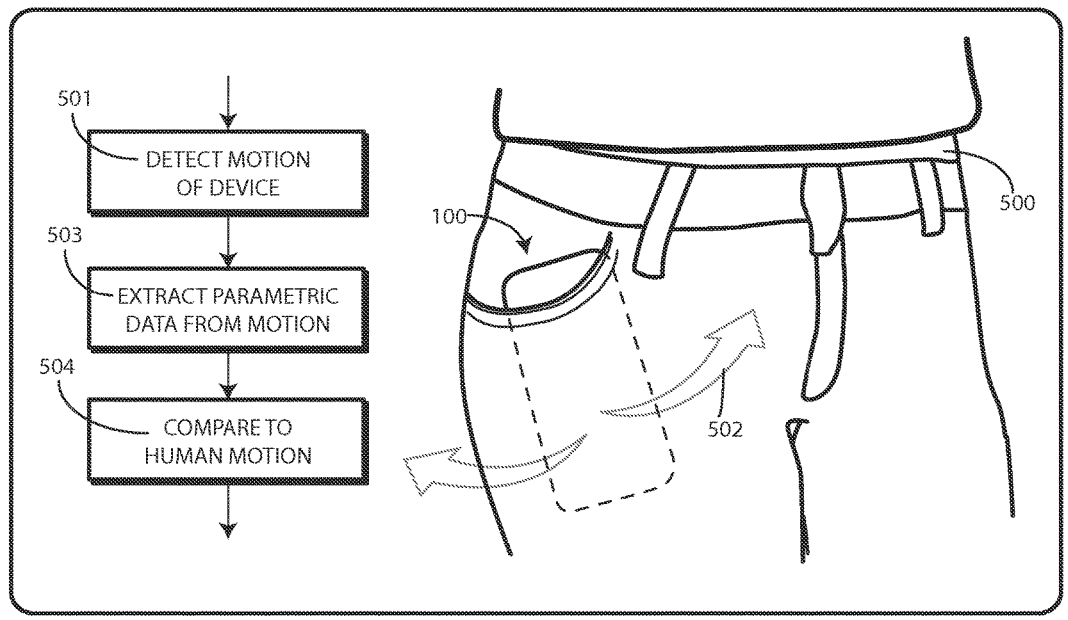
FIG. 5 illustrates one or more method steps in accordance with one or more embodiments of the disclosure.

Turning now to FIG. 5, illustrated therein is the motion detection factor. As shown in FIG. 5, in one embodiment the one or more processors (116) of the electronic device 100 detect 501 motion 502 of the electronic device 100. The one or more processors (116) then extract 503 parametric data 504 from signals corresponding to the motion 502 as delivered by the motion detector (142). The one or more processors (116) can then compare 505 the motion to human motion 506 to confirm that the electronic device 100 is disposed along a human body 500. When the electronic device 100 is disposed in the pocket 401, the one or more processors (116) will detect human motion data.

Figure 6:
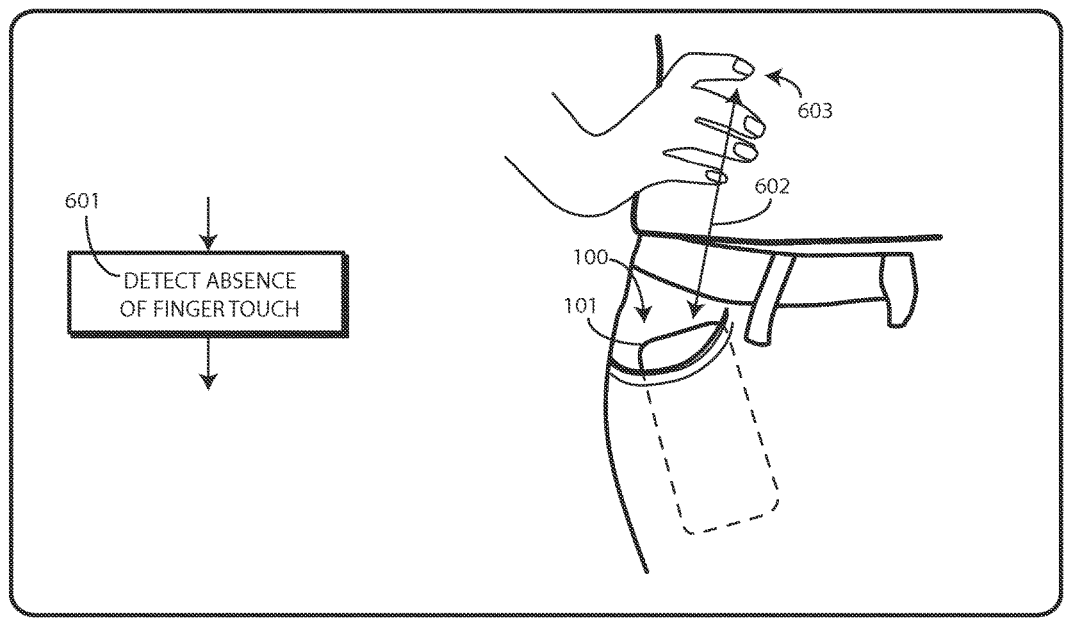
FIG. 6 illustrates one or more method steps in accordance with one or more embodiments of the disclosure.

Turning now to FIG. 6, the one or more processors (116) can then detect 601 an absence 602 of finger touch 603 along a housing 101 of the electronic device 100. When the electronic device 100 is disposed within the pocket 401, the one or more processors (116) will accordingly detect that the user 400 is not touching the electronic device 100.

Figure 7:
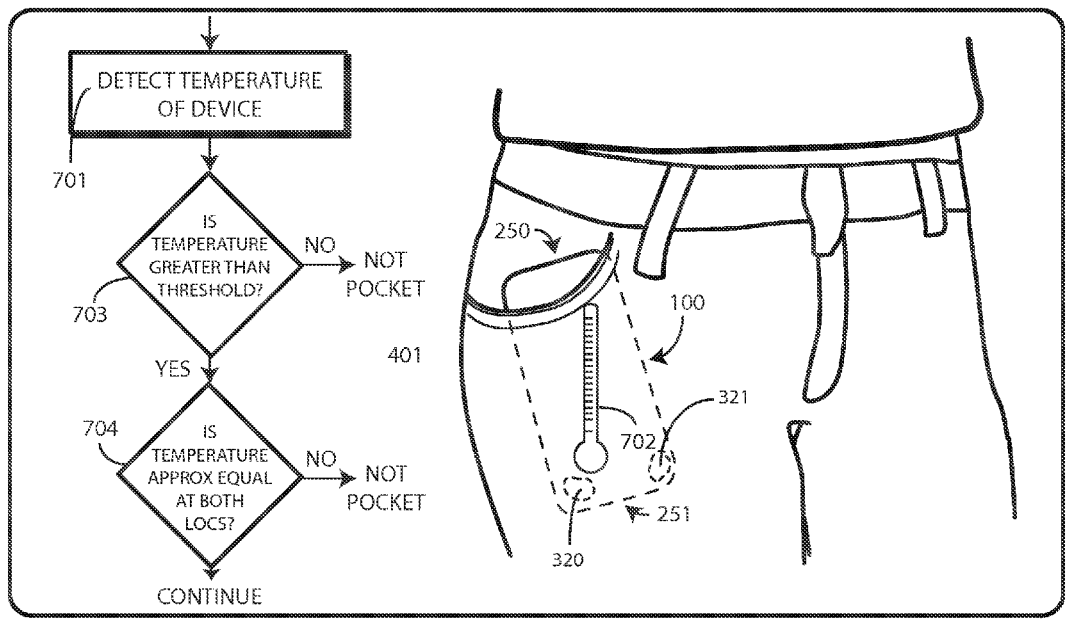
FIG. 7 illustrates one or more method steps in accordance with one or more embodiments of the disclosure.

Turning now to FIG. 7, the one or more processors (116) can detect 701 the temperature 702 of the electronic device 100 using the temperature sensor (211) or alternatively the proximity sensor components (140). This temperature detection can be done for the electronic device 100 overall, at selective locations 320,321, or at a first end 250 and at a second end 251. In one embodiment, the one or more processors (116) can determine if any or all of the electronic device temperature, the temperature of the first end 250 of the electronic device 100, or the temperature at the second end of the electronic device 100 exceeds a predetermined threshold, such as eighty degrees Fahrenheit. In another embodiment, shown at decision 703, the one or more processors (116) can determine if the temperature of the first location 320 of the electronic device 100 and/or the temperature at the second location 321 of the electronic device 100 exceeds a predetermined threshold, such as eighty degrees Fahrenheit. Where it does not, the electronic device 100 may be stored in another vessel such as a drawer. Where it is, this optional decision 703 can confirm that the electronic device 100 is actually disposed within the pocket 401.

In one or more embodiments, as shown at decision 704, the one or more processors (116) can detect a temperature 702 of the electronic device 100 at both the first location 320 and at the second location 321. The one or more processors (116) can determine whether these temperatures define an approximately common temperature. As noted above, in one embodiment the approximately common temperature is defined by a temperature difference that is within a predefined range. In one illustrative embodiment, the temperature difference is plus or minus two degrees centigrade. Other ranges will be obvious to those of ordinary skill in the art having the benefit of this disclosure. Where the temperature 702 is an approximately common temperature, this can indicate that there is no significant differential as would be the case if the user was holding either the first end 250 or the second end 251 in their had with the other end in the air. This is indicative of the electronic device 100 being disposed within the pocket 401.

In one or more embodiments, after executing the method steps shown in FIGS. 5-7, the one or more processors can confirm that the electronic device 100 is disposed within the pocket 401 when the motion 502, as determined by the motion detector (142) includes parametric data 504 corresponding to human movement, the absence of finger touch 603 is confirmed, and the temperature 702 at the first location 320 and the second location 321 is within a predefined range. Accordingly, when an electronic device 100 is placed within a pocket 401, embodiments of the disclosure confirm no side touching is occurring with a touch sensor (155) and confirm that motion 502 corresponds to human movement, and when both conditions are true, then confirm with either a temperature sensor (211) or one or more proximity sensor components (140) that a warm body is adjacent to the electronic device 100. Where proximity sensor components (140) are used, it can be preferable to use the sensors disposed at the bottom of the electronic device 100. These can be selected based upon a determination of a gravity direction as explained below. If both bottom proximity sensor components indicate similar thermal levels, then electronic device 100 is determined to be in a pocket 402.

There are additional, optional steps that can be performed ensure that the conclusion that the electronic device 100 is disposed within the pocket 401 has a lower margin of error. Turning now to FIGS. 8-12, illustrated therein are a few such steps. Others will be obvious to those of ordinary skill in the art having the benefit of this disclosure.

Figure 8:
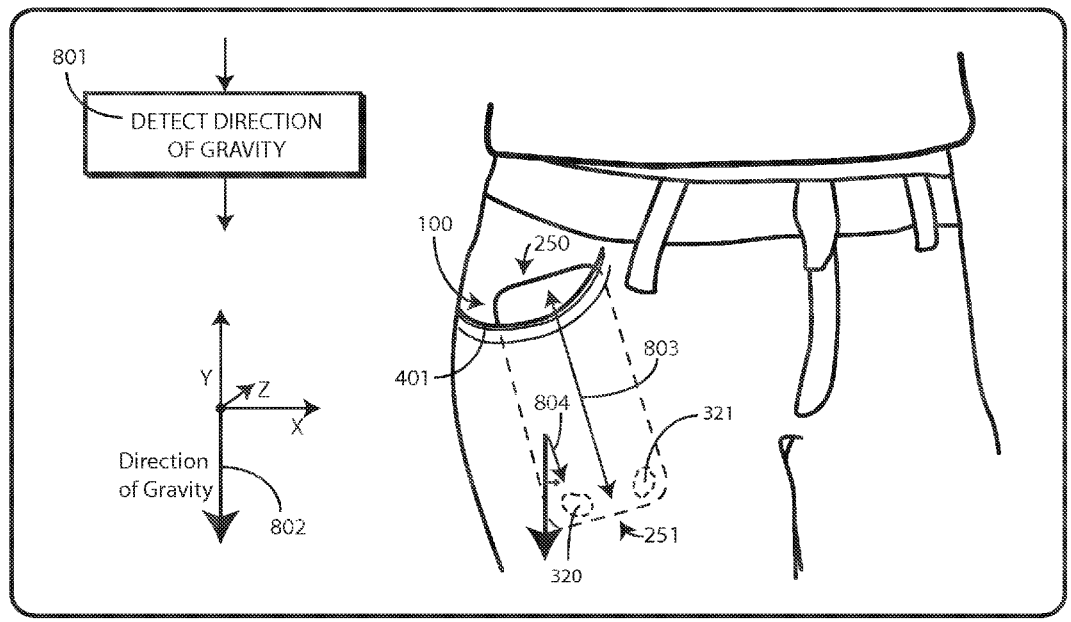
FIG. 8 illustrates one or more method steps in accordance with one or more embodiments of the disclosure.

Beginning with FIG. 8, in one or more embodiments, the one or more processors (116) are further operable to determine 801 a gravity direction 802 relative to the electronic device 100. This can be done with the accelerometer 152 in one embodiment. In one or more embodiments, the one or more processors (116) are further operable to determine an orientation 803 of the electronic device 100 once the electronic device 100 has been placed within the pocket 401. Accordingly, in one or more embodiments the one or more processors (116) confirm that at least a component 804 of the gravity direction 802 runs from a first end 250 of the electronic device 100 to a second end 251 of the electronic device 100 to confirm the in-pocket status, as the electronic device 100 will generally be right side up or upside down when in a front or rear pants pocket. In one embodiment, once the "most downward" pointing end is determined, i.e., the second end 251 in this example, the first location 320 and the second location 321 can be determined as a function of this end. For example, in one embodiment, both the first location 320 and the second location 321 are disposed at a common end, which is the most downward pointing end, or the second end 251 in this example. This ensures that both the first location 320 and the second location 321 are disposed within the pocket 401.

In the illustrative embodiment of FIG. 8, the first end 250 is the end with the earpiece speaker (161), while the second end 251 is the end with the microphone (160). If the electronic device 100 were inverted, the opposite would be true. Embodiments of the disclosure contemplate that if the electronic device 100 is disposed within a pocket 401, it is frequently the case that the one of the earpiece speaker (161) or the microphone (160) will be higher than the other. Accordingly, in one embodiment the one or more processors (116) check for this condition as an extra confirmation to the in-pocket condition.

Figure 9:
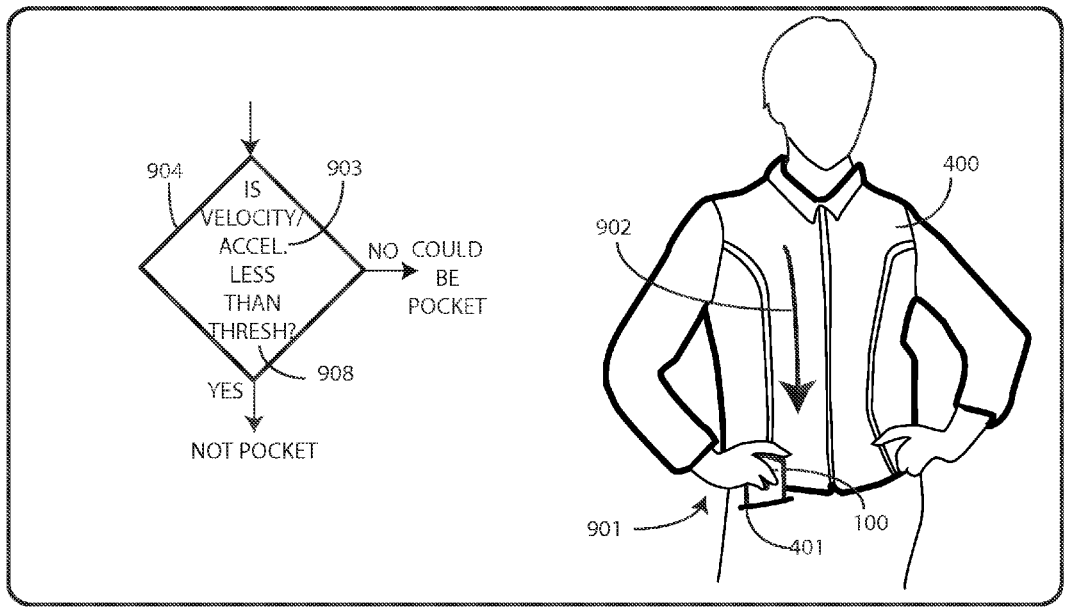
FIG. 9 illustrates one or more method steps in accordance with one or more embodiments of the disclosure.

Turning now to FIG. 9, the user 400 is shown placing 901 the electronic device 100 within her pocket 401. The movement 902 used to place the electronic device 100 in the pocket 401 has associated therewith a velocity and acceleration 903. In one embodiment the one or more processors (116) can determine 904, with the motion detector (142) whether the movement 902 and/or motion profile, which can include velocity and acceleration, duration, and the stopping of the motion occurring during the movement 902 exceeds a predetermined threshold 905. In one embodiment, a predetermined acceleration threshold is about 0.5 meters per second square net of gravity. Embodiments of the disclosure contemplate that the user 400 will take care to ensure that the electronic device 100 is safely placed within the pocket. Accordingly, the movement 902 will be slow and deliberate. Additionally, when a person is walking, the motion (502) of the electronic device 100 will be slow as well. If a person is simply sitting in a chair and breathing, the velocity and acceleration 903 experienced by the electronic device 100 will be low as well. By confirming that characteristics of the movement, such as velocity and acceleration 903 are below a predefined threshold, this can serve as an additional confirmation of the in-pocket condition.

In one or more embodiments, the acceleration determination can be used in other ways as well. First, it can be used to confirm that the movement 902 moving the electronic device 100 occurred with the gravity direction (802), i.e., downward, as would be the case when placing the electronic device 100 in a pocket 401, but not when raising the electronic device 100 to the user's ear. Second, by comparing the acceleration to a predetermined threshold, the acceleration can be used to confirm that a user is actually placing the electronic device 100 in a pocket rather than performing some other operation, such as waving the electronic device 100 around. Other uses for the acceleration data will be obvious to those of ordinary skill in the art having the benefit of this disclosure.

Figure 10:
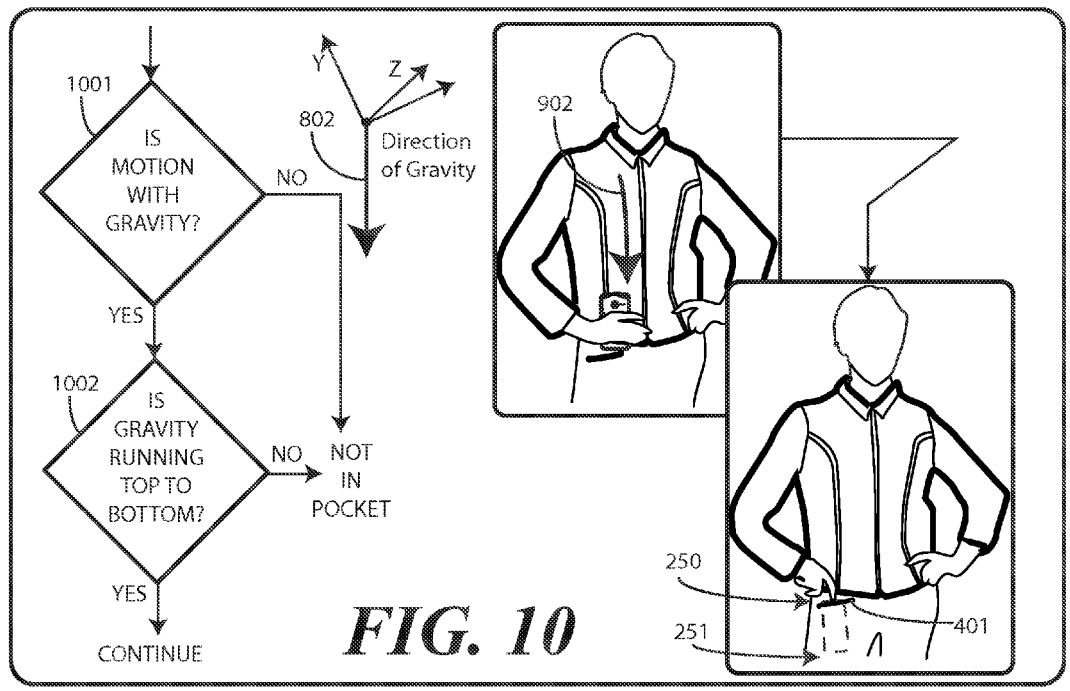
FIG. 10 illustrates one or more method steps in accordance with one or more embodiments of the disclosure.

Illustrating by example, and turning now to FIG. 10, the one or more processors (116) can compare the movement 902 to the gravity direction 802. For example, in one embodiment the one or more processors can determine 1001 whether at least some of the movement 902 was against the gravity direction 802. Similarly, in one embodiment the one or more processors (116) can determine 1002 whether a component of the gravity direction 802 runs from a predefined first end 250 of the electronic device 100 to a predetermined second end 251 of the electronic device 100. As noted above, this step can ensure that the earpiece speaker (161) is above the microphone (160), or vice versa, which can be indicative of the electronic device 100 being disposed within a pocket 401.

Figure 11:
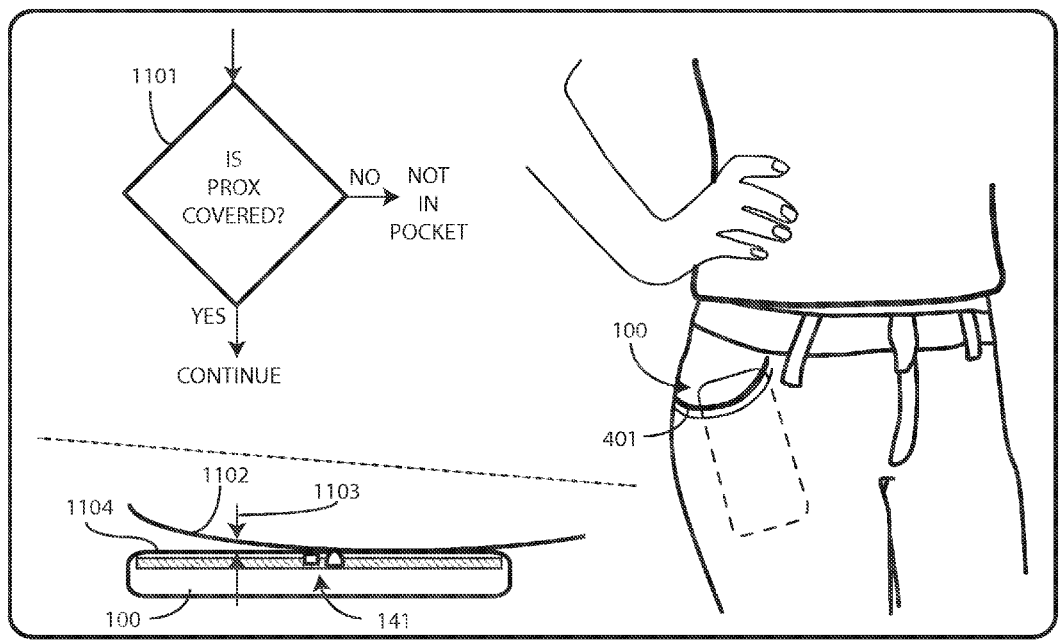
FIG. 11 illustrates one or more method steps in accordance with one or more embodiments of the disclosure.

Turning to FIG. 11, the one or more processors (116) can further confirm that the electronic device 100 is in the pocket 401 by determining 1101 whether an object 1102, such as clothing, textile materials, or other natural, synthetic, or blend layer is covering the electronic device 100. This determination 1101 can be made when the one or more processors (116) receive signals from the one or more proximity detector components 141 indicating that an object 1102, such as textile material, is less than a predefined distance 1103 from a surface 1104 of the electronic device 100, thereby indicating that the electronic device 100 is covered by the object 1102. Where this occurs, the one or more processors (116) can further confirm that the electronic device 100 is disposed within the pocket 401. This detection of an object 1102 covering the electronic device 100 can also serve as a confirmation that the electronic device 100 is not being touched as well.

Figure 12:
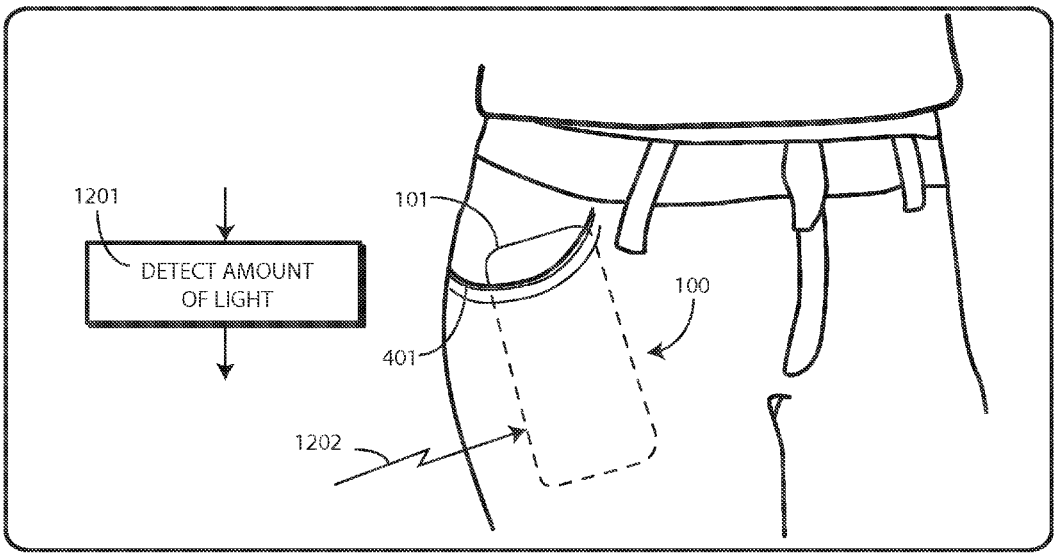
FIG. 12 illustrates one or more method steps in accordance with one or more embodiments of the disclosure.

Turning now to FIG. 12, the one or more processors (116) can determine 1201, with a light sensor (207), whether ambient or direct light 1202 is incident on the housing 101 of the electronic device 100. Of course, when the electronic device 100 is covered by the pocket 401, ambient or direct light 1202 is generally not incident on the housing 101. In the example of FIG. 12, some of the housing 101 is exposed from the pocket 401. However, the vast majority of the housing 101 is within the pocket 401. Modern light sensors (207) are more than capable of determining that the majority of the housing 101 is covered. Accordingly, in one or more embodiments the determination that the electronic device 100 is disposed within the pocket 401 can further include determining, with a light sensor (207), that ambient or direct light 1202 is not incident on the housing 101. Again, that is the electronic device 100 is determined to be in the pocket 401 instead of on another surface when tilts and small motions are detected via the accelerometer combined with the electronic device 100 not being touched as determined by edge touch sensors.

The factors listed above can be used in the function of determining whether the electronic device 100 is disposed within a pocket 401 alone or in combination. For example, the function can consider one, two, three, or all of the factors. Considering more factors assists in preventing false detection of the in-pocket condition. Embodiments of the disclosure contemplate that a user should be minimally affected due to false detection. Accordingly, in one embodiment the one or more processors (116) consider all factors. However, subsets of the factors can be useful in many applications.

Figure 13:
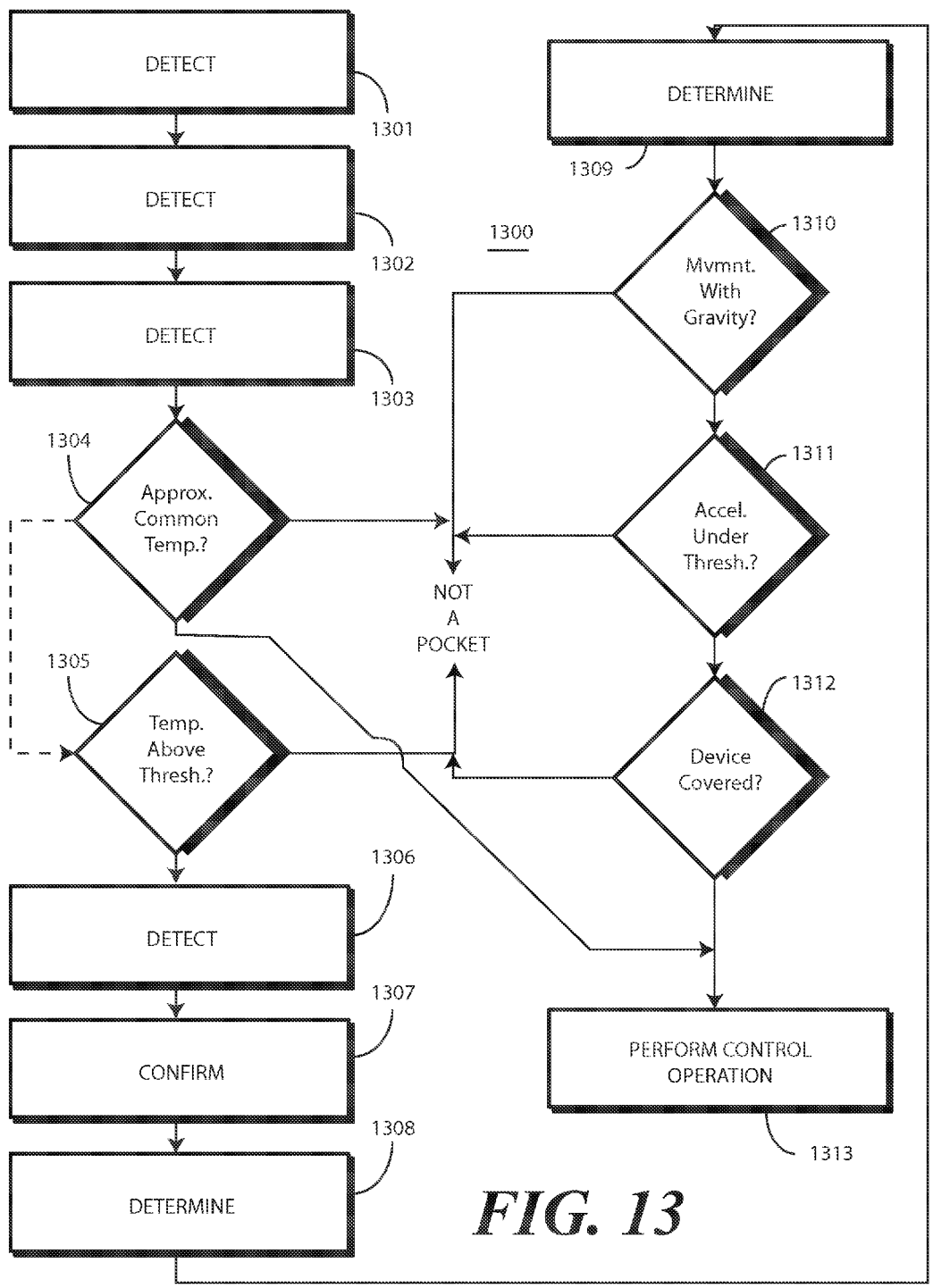
FIG. 13 illustrates one explanatory method for an electronic device in accordance with one or more embodiments of the disclosure.

Turning now to FIG. 13, illustrated therein is one explanatory method 1300 for controlling an electronic device in accordance with one or more embodiments of the disclosure. At step 1301, the method 1300 includes detecting, with a motion sensor, the motion of an electronic device. In one or more embodiments, when the electronic device is disposed within a pocket, the motion detected at step 1301 is defined by parametric data corresponding to motion of a user's body.

At step 1302, the method 1300 includes detecting, with a touch sensor, the absence of any finger touch along surfaces of a housing the electronic device. At step 1303, the method 1300 includes detecting, with one or more proximity sensors or a temperature sensor, a temperature at both a first location of the electronic device and a second location of the electronic device. The first location and the second location can be disposed on the same edge, e.g., the lower right and lower left corners of the electronic device because the opposite edge sensor could be protruding outside of the pocket and not experience the approximately common temperature. As noted above, the accelerometer or other motion sensor can be used to tell which edge is on bottom of pocket. Accordingly, proximity sensor components and/or temperature sensors on that edge can be used to sense temperature.

At decision 1304, the method 1300 can determine whether these two temperature readings constitute an approximately common temperature. For example, in one in one embodiment, an approximately common temperature is defined when a temperature difference of plus or minus two degrees centigrade or less occurs between the first end of the electronic device and the second end of the electronic device. Other ranges will be obvious to those of ordinary skill in the art having the benefit of this disclosure.

At optional decision 1305, the method 1300 can determine whether temperature at both the first location of the electronic device and the second location of the electronic device is above a predetermined threshold. For example, if the electronic device is disposed within the pocket of clothing that a user is wearing, its temperature will likely be higher than if the electronic device was disposed in a pocket.

At step 1306, the method 1300 can detect that the electronic device is disposed within a pocket as a function of at least motion of the electronic device, an absence of finger touch along the housing of the electronic device, and that an approximately common temperature occurs at both the first end of the electronic device and the second end of the electronic device.

Other optional steps can be performed to confirm with higher and higher degrees of certainty that the electronic device is actually disposed within a pocket. For example, at optional step 1307, the method 1300 can confirming that a component of the gravity direction runs from a predefined first end of the electronic device to a predefined second end of the electronic device. In one embodiment, the predefined first end comprising one of an earpiece speaker or a microphone, while the predefined second end comprising another of the microphone or the earpiece speaker.

At optional step 1308, the method 1300 can determine, with a light sensor, that direct light is not incident along the housing of the electronic device. At optional step 1309, the method 1300 can determine a direction of gravity. At optional decision 1310, the method 1300 can determine whether at least a portion of a direction of movement of the electronic device, occurring prior to the motion of step 1301, was oriented with the gravity direction.

At optional decision 1311, the method can confirm whether an acceleration of the movement occurring prior to the motion of step 1301 was below a predetermined acceleration threshold. At optional decision 1312, the method 1300 can determine, with at least one proximity detector component comprising a signal emitter and a corresponding signal receiver, that at least one object external to the housing is less than a predefined distance from the housing.

As a function of the various steps, in one embodiment when the method 1300 determines that the electronic device is disposed within a pocket, the method 1300 can perform, by one or more processors operable with the one or more sensors, a control operation in response to the electronic device being disposed within the pocket at step 1313. In one embodiment, the control operation comprises transitioning the electronic device from a first mode of operation to a second mode of operation. For example, step 1313 can include transitioning the electronic device from an active mode of operation to a low power or sleep mode of operation.

Figure 14:
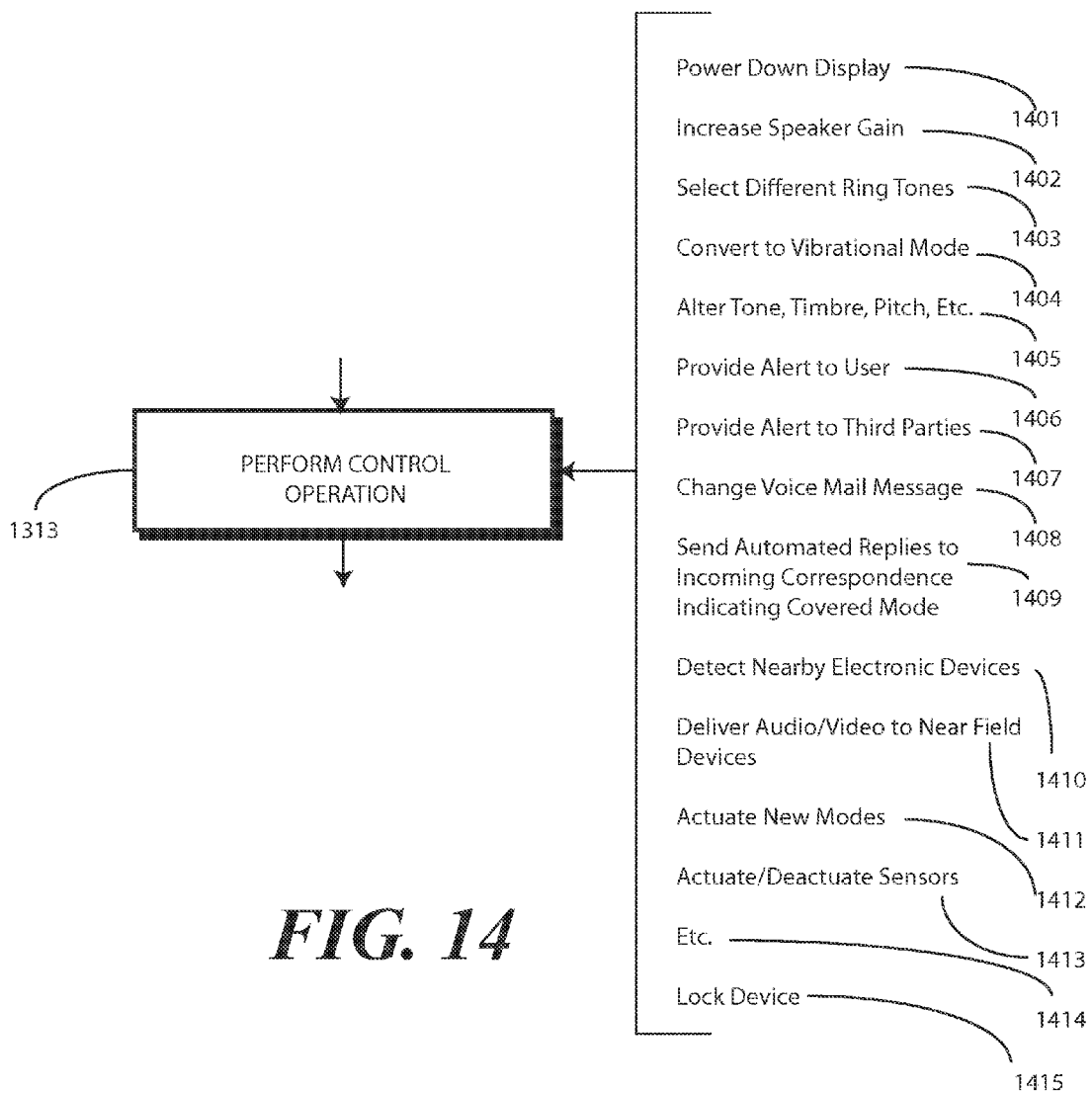
FIG. 14 illustrates explanatory control operations suitable for use with methods and electronic devices in accordance with one or more embodiments of the disclosure.

Additional control operations can occur as well. Turning now to FIG. 14, illustrated therein are a few explanatory examples. In a first embodiment, step 1313 can include causing the electronic device to enter a power saving operational mode 1401. In another embodiment, step 1313 can include adjusting an output gain of one or more audio output devices. For example, the volume of loudspeakers can be increased when the electronic device is covered by clothing.

In another embodiment, step 1313 can include adjusting an output notification 1403 of one or more loudspeakers of the electronic device. For example, a unique ring tone can be selected for the in-pocket mode of operation. The ring tone selected may be more audible through clothing. In another embodiment, step 1313 can include actuating a vibration mode 1404 of the electronic device. In yet another embodiment, step 1313 can include adjusting one or more of a pitch, tone, spectral content, pattern, timbre, or combinations thereof 1405 of alert tones emitted by the electronic device. For example, a ring tone could be spectrally altered to better penetrate through clothing.

In another embodiment, step 1313 can include providing an alert 1406 to the user. The alert, which may be in the form of a vibration, alert beep, or other indicator, can be configured to notify the user that clothing is obscuring the electronic device. In another embodiment, step 1313 can include transmitting one or more notification messages 1407. For example, when incoming messages or calls are received, an automatic notification may be returned indicating that the user may not be aware that the incoming communication was received.

In yet another embodiment, step 1313 can include changing a voice mail message 1408 or sending automated replies to incoming communications 1409. A pre-recorded voice mail message may be changed from "I'm available but away from the phone," to "I'm in transit and cannot answer the phone." Such a change in a voice mail message may be dependent, in one embodiment, upon a contextual data comparison with expected contextual data. For example, if sensors in the electronic device indicate that the user is outside of any building or dwelling, that the season is winter, and that the temperature of the device is substantially warmer than the expected ambient temperature, the electronic device may conclude that the user is wearing a coat and in transit.

In another embodiment, step 1313 can include detecting nearby electronic devices 1410 and, where available, wirelessly delivering audio, video, or combinations thereof to another electronic device disposed within a near-field communication radius of the electronic device. Accordingly, the user could see information normally presented on the display of the electronic device on another local device, e.g., a personal computer, without the need of removing the electronic device from the pocket of a garment.

In another embodiment, the nearby electronic devices 1410 may comprise audio or video or communication systems in a vehicle. For example, a user may be in a vehicle having audio output devices, video output devices, or built-in communication devices such as On-Star™ safety systems or mobile phones. In one embodiment, when in the pocket, step 1313 can include detecting one or more of the vehicular systems and, where available, wirelessly delivering audio, video, or combinations thereof to another electronic device disposed within the vehicle.

In an alternate embodiment, the device may transfer communication control. For example, if the user is in a vehicle and the electronic device is in-pocket, step 1313 can include detecting nearby electronic devices 1410 and transferring functions to a complementary device. In this example, the electronic device may forward phone functionality to the built-in phone system of the vehicle while the wearer is in the vehicle. When the device is removed from the pocket, or when the user exits the vehicle, the electronic device can reclaim any functionality that was delegated due to clothing coverage.

In yet another embodiment, step 1313 can include the actuation of new operating modes. For example, when the electronic device is in-pocket, a near-field communication mode may be launched to locate audio or video output devices proximately located with the user. In yet another embodiment, sensors or electronic components can be deactuated 1413 when the electronic device is in-pocket. For example, the display of the electronic device may be turned OFF until the device is removed from the pocket.

The examples above are illustrative only. Step 1313 can include other steps 1414 as well. For instance, where the electronic device includes multiple microphones, step 1313 can include would select a microphone from the array that is least obscured or that provides the best performance. Alternatively, step 1313 can include enabling or disabling a touch-sensitive display, turning OFF backlighting features of a user interface or display, turning OFF unnecessary features or functions, disabling wireless links, and so forth. Other steps will be obvious to those of ordinary skill in the art having the benefit of this disclosure. In one or more embodiments, step 1313 occurs only where the electronic device is fully disposed within a pocket, as a partially covered device may work fine without changing the operating mode. Step 1313 can also include locking 1415 a user interface of the electronic device as well.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for controlling an electronic device, comprising:
   detecting, with one or more sensors, the electronic device is disposed within a pocket as a function of at least:
     motion of the electronic device;
     an absence of finger touch along a housing of the electronic device; and
     an approximately common temperature occurring at both a first location of the electronic device and a second location of the electronic device; and
   performing, by one or more processors operable with the one or more sensors, a control operation in response to the electronic device being disposed within the pocket.

2. The method of claim 1, the approximately common temperature defined by a temperature difference of plus or minus two degrees centigrade, or less, between the first location of the electronic device and the second location of the electronic device.

3. The method of claim 1, the motion defined by parametric data corresponding to motion of a user's body.

4. The method of claim 3, further comprising detecting:
   with a motion sensor, the motion of the electronic device;
   with a touch sensor, the absence of the finger touch; and
   with one or more proximity sensor components, the approximately common temperature.

5. The method of claim 4, further comprising confirming the approximately common temperature exceeds a predetermined threshold.

6. The method of claim 5, the detecting the electronic device is disposed within the pocket further comprising confirming that a component of a gravity direction runs from a predefined first end of the electronic device to a predefined second end of the electronic device.

7. The method of claim 6, the first location and the second location disposed at the predefined second end.

8. The method of claim 1, the detecting the electronic device is disposed within the pocket further comprising determining, with a light sensor, that direct light is not incident on the housing.

9. The method of claim 1, further comprising:
   detecting, with a motion sensor, movement of the electronic device prior to the motion;
   determining, with the one or more processors, a direction the electronic device moves during at least a portion of the movement; and
   detecting, by the motion sensor, a gravity direction; and
   the detecting the electronic device is disposed within the pocket further comprising confirming, with the one or more processors, the direction is with the gravity direction.

10. The method of claim 9, further comprising determining, with the motion sensor, an acceleration occurring during the movement, the detecting the electronic device is disposed within the pocket further comprising confirming the acceleration is less than a predetermined acceleration threshold.

11. The method of claim 1, further comprising determining, with at least one proximity detector component comprising a signal emitter and a corresponding signal receiver, that at least one object external to the housing is less than a predefined distance from the housing.

12. The method of claim 1, the control operation comprising transitioning the electronic device from a first mode of operation to a second mode of operation.

13. The method of claim 12, the second mode of operation comprising a low-power or sleep mode.

* * * * *